Feb. 1, 1955 W. J. SCHEMERS 2,701,168
ELEVATED PLATFORM DOLLY
Filed Nov. 7, 1949
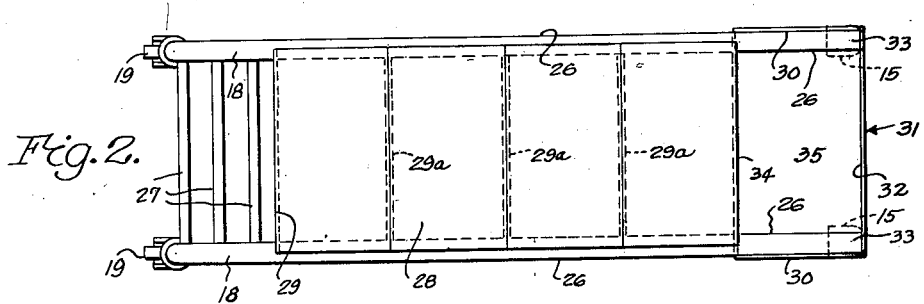
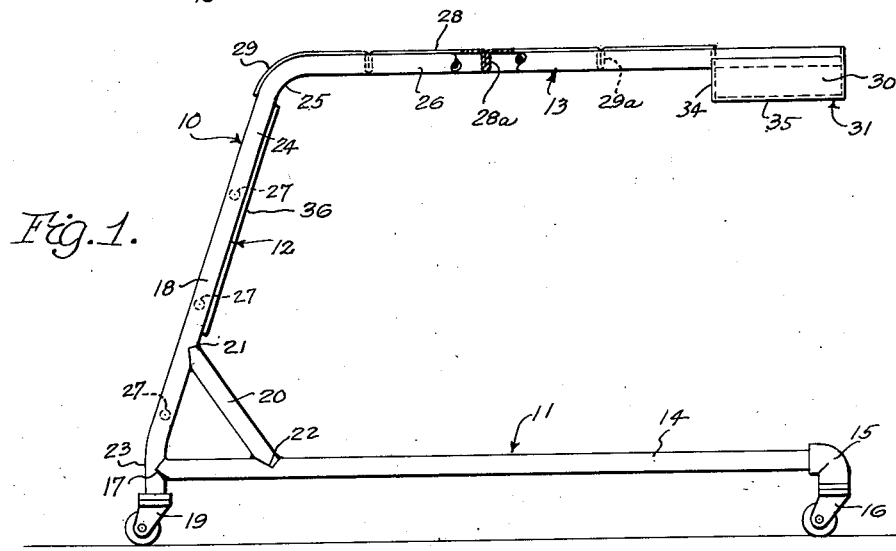
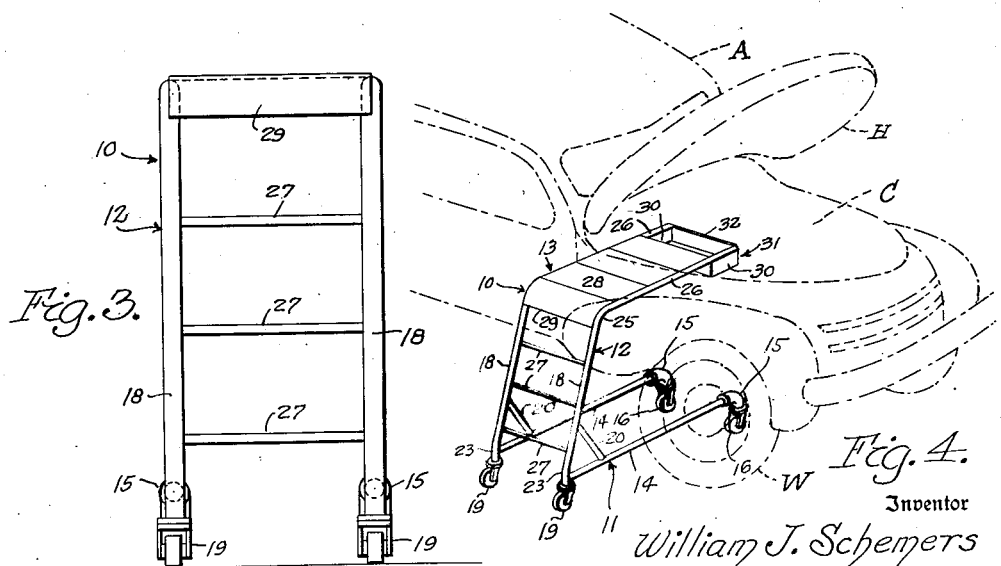
Inventor
William J. Schemers
By Barthel & Bugbee
Attorneys

United States Patent Office 2,701,168
Patented Feb. 1, 1955

2,701,168

ELEVATED PLATFORM DOLLY

William J. Schemers, Detroit, Mich.

Application November 7, 1949, Serial No. 125,968

1 Claim. (Cl. 304—9)

This invention relates to workers' supports, and in particular, to such supports adapted for work on objects located at a moderate height above the floor, such as motor vehicles.

One object of this invention is to provide a dolly having an elevated platform on which a workman may sit or lie, while working on an object, such as a machine or motor vehicle, at a height above the floor.

Another object is to provide a dolly having an elevated platform secured to a steeply-inclined ladder or upright structure rising from one end of the base of the dolly and overhanging the base so that the base may roll under the machine or be inserted beneath it, while the platform overhangs the machine, thus bringing the machine or vehicle into convenient working distance of the workman.

Another object is to provide an elevated platform dolly, as set forth in the foregoing objects, wherein the platform is approximately parallel to the base and is optionally provided with a tool or workpiece tray within convenient reach of the workman.

Another object is to provide an elevated platform dolly, as set forth in the foregoing objects, wherein the upright structure is arranged with rungs for the workman's feet either in mounting the platform or while working thereon.

In the drawings:

Figure 1 is a side elevation, partly in vertical section, of an elevated platform dolly, according to one form of the invention;

Figure 2 is a top plan view of the elevated platform dolly shown in Figure 1;

Figure 3 is a left-hand end elevation of the elevated platform dolly shown in Figures 1 and 2; and Figure 4 is a perspective view showing the elevated platform dolly in use ready for work upon the engine of a passenger automobile.

Referring to the drawings in detail, Figure 1 shows an elevated platform dolly, generally designated 10, as including a base structure 11, a steeply-inclined ladder or upright structure 12, and an elevated cantilever platform or top structure 13 overhanging the base structure 11. The base structure 11 consists of a pair of approximately horizontal members 14 having elbows 15 at their forward ends and casters 16 swiveled in the lower ends of the elbows 15. The horizontal members 14 are spaced laterally apart from one another a sufficient distance to span and pass freely on opposite sides of a vehicle wheel, and at their rearward ends are joined as by welding at the points 17 to the lower portions of upwardly-inclined side or upright members 18 forming the side members of the upright structure 12. Casters 19 are swiveled in the lower ends of the upright members 18 which are high enough to place their upper ends above the hood of a conventional automobile, and which are braced relatively to the horizontal members 14 by inclined or diagonal braces 20 secured thereto as by welding at the points 21 and 22 respectively.

The upright members 18 are spaced apart from one another at approximately the same separations as the horizontal members 14 and their lower end portions 23 carrying the casters 19 are approximately vertical, whereas their upper portions 24 (Figure 1) are inclined steeply upward and are bent as at 25 at their upper ends to continue in spaced parallel cantilever side members 26 forming the supports for the platform structure 13. The upright members 18 are preferably approximately parallel to the base members 14 of the base structure 11 and are interconnected by rungs or stop members 27 (Figures 2 and 3) secured thereto at their opposite ends, as by welding.

The platform or top structure 13, in addition to the side members 26, includes a platform 28 of sheet metal, the rearward portion of which is curved as at 29 to overlie the curved junctions 25 between the uprights 18 and the horizontal or side members 26. The platform 28 extends over the top of the side members 26 and is preferably secured thereto as by welding, and is provided with reversely bent ribs 29a arranged at intervals therealong for strengthening the platform and making the platform structure 13 more rigid.

Secured as by welding to the lower sides of the side members 26 at the outer or forward ends thereof are the opposite sides of a tray 31, the forward wall 32 of which is secured as by welding to the forward ends 33 of the side members 26, or is dropped below the level of the top of the tray sides 30 in order to pass beneath the side members 26. The tray 31 is, of course, provided with a bottom wall 35 and optionally has subdivisions (not shown), if desired. The tray 31 serves to hold tools or workpieces within convenient reach of the workman.

In the use of the invention (Figure 4), as in working upon the engine of an automobile A having front wheels W and a hood H covering an engine compartment C, the base structure 11 is rolled beneath the vehicle, if necessary and convenient, with the side members 14 thereof passing on opposite sides of the wheel W. In this position, the tray 31 and elevated platform structure 13 extend horizontally over the engine compartment C. When the dolly 10 has been arranged in the desired location for the particular job to be done, the workman mounts the dolly by means of the rungs 27 and stretches out horizontally upon the platform structure 13, and in this position performs his work. The platform structure 13 is sufficiently narrow to permit the workman to extend his arms downward on opposite sides of the side member 26 thereof and use both hands while working upon the engine or other object being worked upon. As previously stated, he may place his tools, parts or workpieces in the tray 31 where they are conveniently at hand.

When the workman has completed his job, he dismounts from the dolly and then rolls the latter out from underneath the vehicle, whereupon it is available for other work and the vehicle can then be removed.

To prevent damaging a vehicle, a rubber cushion strip 36 is secured to the inner edge of each upright member 18.

What I claim is:

An elevated work dolly for supporting a workman in a partially prone position over the hood and engine of an automobile, said dolly comprising a forwardly-leaning ladder having laterally-spaced steeply-inclined side bars with vertically-spaced horizontal steps extending therebetween and having casters on the lower ends thereof; a pair of laterally-spaced elongated horizontal lower bars secured to said ladder side bars near the lower ends thereof and extending forwardly therefrom, said lower bars having casters on the forward ends thereof; a pair of laterally-spaced elongated horizontal cantilever upper bars secured at their rearward ends to the upper ends of said ladder side bars and extending forwardly therefrom parallel to said lower bars with their forward ends substantially directly over the forward ends of said lower bars, the space beneath substantially the entire lengths of said upper bars vertically downward to said lower bars being entirely open and unobstructed; and a narrow elongated platform of less than average human shoulder width mounted on said upper bars, said platform being narrower than the height between the platform and lower bars and being longer than said height; whereby a workman may lie prone on said platform while extending his arms downward on opposite sides thereof so as to use both hands in working on said engine beneath him.

(References on following page)

References Cited in the file of this patent

UNITED STATES PATENTS

| Number | Name | Date |
|---|---|---|
| D. 131,316 | Dann | Feb. 3, 1942 |
| D. 145,777 | Clachko | Oct. 22, 1946 |
| 1,104,398 | Zimmerman | July 21, 1914 |
| 1,353,660 | Main | Sept. 21, 1920 |
| 1,544,935 | Preston | July 7, 1925 |
| 1,954,449 | Klee | Apr. 10, 1934 |
| 2,234,483 | Sutton | Mar. 11, 1941 |
| 2,346,919 | Hillenbrand | Apr. 18, 1944 |
| 2,362,170 | Swaisgood | Nov. 7, 1944 |
| 2,485,413 | Ross | Oct. 18, 1949 |
| 2,522,744 | Budd | Sept. 19, 1950 |
| 2,560,059 | Young | July 10, 1951 |
| 2,560,342 | Hanson | July 10, 1951 |
| 2,624,590 | Tilton | Jan. 6, 1953 |

FOREIGN PATENTS

| Number | Country | Date |
|---|---|---|
| 545,348 | France | Oct. 10, 1922 |